United States Patent [19]

Fiscus et al.

[11] Patent Number: 4,588,619

[45] Date of Patent: May 13, 1986

[54] METHOD FOR CONVERTING A LENS

[76] Inventors: Walter J. Fiscus, 11914 Blue Spruce, 77066; Ronnie L. Byrum, 1501 Azalea Trace, both of Houston, Tex. 77066

[21] Appl. No.: 644,854

[22] Filed: Aug. 27, 1984

[51] Int. Cl.[4] .............................................. B32B 31/00

[52] U.S. Cl. ...................................... 428/31; 350/101; 362/61; 427/162; 428/38

[58] Field of Search ..................... 427/162; 428/31, 38; 350/101, 452; 362/61, 311

[56] References Cited

U.S. PATENT DOCUMENTS

| | | | |
|---|---|---|---|
| 1,623,711 | 4/1927 | Trimmer | 427/162 |
| 1,828,233 | 10/1931 | Smith | 350/101 |
| 2,241,365 | 5/1941 | Meyer | 428/31 X |
| 2,351,536 | 6/1944 | Osterberg et al. | 427/162 |
| 2,685,231 | 8/1954 | Onksen | 350/452 X |
| 3,973,342 | 8/1976 | Gubela | 428/31 X |
| 4,025,158 | 5/1977 | Tsuyama | 428/31 X |
| 4,284,453 | 8/1981 | Endrizzi | 428/151 X |
| 4,443,832 | 4/1984 | Kanamori et al. | 428/31 X |

*Primary Examiner*—Henry F. Epstein

*Attorney, Agent, or Firm*—Gunn, Lee & Jackson

[57] ABSTRACT

A motor vehicle lens manufactured for use in the European market is converted to comply with United States laws and regulations by grinding the textured interior surface of the lens, applying multiple coats of a transparent filler to the ground interior surface of the lens, applying a colored stain to the exterior and interior surfaces of the lens, and mounting a reflective panel to the interior surface of the lens. The converted motor vehicle lens comprises a translucent plastic panel contoured to fit a support housing, the panel having an exterior stained surface and a stained substantially flat interior surface. The substantially flat interior surface is formed by grinding the interior surface and applying multiple coats of the transparent filler to the interior surface of the lens. A reflective panel mounted to the interior surface of the lens permits the transmission of light from an incandescent bulb located in the support housing to pass through the converted lens. Light originating from an exterior source and passing through the lens is reflected back through the lens by the reflective panel.

12 Claims, 5 Drawing Figures

METHOD FOR CONVERTING A LENS

BACKGROUND OF THE DISCLOSURE

1. Field of the Invention

This invention pertains to a method for converting a translucent lens having an interior textured light diffusing surface into a lens through which light can be reflected by the addition of a reflective panel. This invention also pertains to a lens which has been converted using the aforementioned method.

2. Description of the Prior Art

Motor vehicles which are manufactured in Europe for delivery to the European market are substantially different from motor vehicles which are manufactured in Europe for delivery to the American market. These differences are caused by variances in U.S. and European governmental regulations. Many consumer advocates would argue that the U.S. regulations are stricter and therefore U.S. motor vehicles are safer than their European counterparts and less damaging to the environment.

Motor vehicles which have been purchased in Europe and are subsequently imported into the United States must be converted to comply with U.S. laws and regulations. For example, the doors of many European motor vehicles must be strengthened with an interior bracket which is a standard feature on vehicles manufactured in the United States. All sorts of emission control devices are added to European motor vehicles which are subsequently imported into the U.S. The bumpers on many European motor vehicles must be reinforced to make them more crashworthy. The headlights of motor vehicles manufactured for the European market have very high intensity headlights which must be replaced to comply with U.S. regulations.

All cars currently manufactured in America have two red rear side markers. These red side markers are visible from the side of the car, but not from the rear. On some vehicles the side markers are an integral part of the rear lens; on other vehicles the side markers are separate from the rear lens and are located in the left rear quarter panel and the right rear quarter panel. The U.S. side markers have a reflective panel therein which will reflect light from an external source. The U.S. side markers do not cover the reflective panel with a diffusion grid. In addition, the U.S. side markers are illuminated by a light source behind the marker. The light source, which is typically an incandescent bulb, will also pass through the reflective panel.

Cars currently manufactured in Europe for the European market have two rear amber side markers without reflective properties. European-type side markers are typically formed to be an integral part of the rear lens; these side markers typically have a diffusion grid covering the interior surface of the lens. These amber side markers must be converted to red side markers with reflective capabilities to comply with U.S. regulations. European automobile manufacturers produce rear lenses with side markers which conform to U.S. regulations; however, these lenses are relatively expensive.

Prior to this invention, an automobile owner who purchased a car manufactured in Europe for the European market and subsequently imported it into America was forced to discard the original rear lenses and to buy a new set of rear lenses with side markers which conformed to U.S. regulations. This was a very costly exchange which is no longer necessary. This invention converts the existing lens to comply with United States regulations, thereby eliminating the need for the owner to purchase a new set of lenses. The converted lens has the translucent red color and reflective capabilities required by U.S. regulations.

Prior to this invention, various unsuccessful attempts were made to convert European type lenses. Reflective panels were added to the European lens, but the textured interior surface of the lens prevented transmission of light from the reflector to the exterior. One object of this invention is to substantially reduce the light diffusing properties of the textured interior surface of the European-type lens.

SUMMARY OF THE DISCLOSURE

The purpose of this invention is to establish an economical method for converting a lens manufactured in Europe for the European market to a lens which conforms to U.S. regulations. This method consists of four significant steps: grinding the textured interior light diffusing surface of the lens, applying one or more coats of a transparent filler to the ground interior surface of the lens to form a substantially flat surface over the ground textured interior surface, applying a colored stain or dye to the interior and exterior surface of the lens and affixing a reflective panel to the interior surface of the lens. This invention also covers a lens which has been converted using this process comprising a translucent plastic panel, a transparent coating applied to the interior surface of the translucent plastic panel, a translucent red stain or dye applied to the exterior and interior surfaces of the panel and a reflector mounted on the interior surface of the panel or on a frame which is subsequently mounted on the panel.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
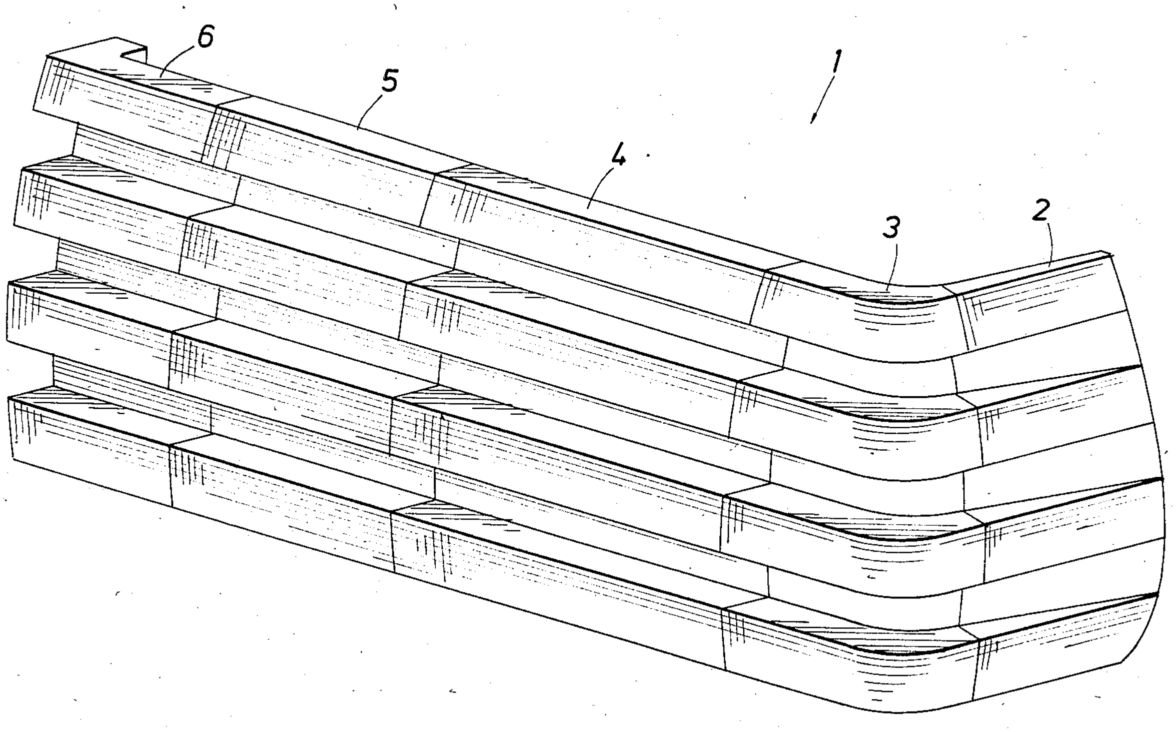
FIG. 1 shows the exterior surface of a rear lens with side marker in perspective.

In FIG. 1, a translucent motor vehicle lens is generally identified by the numeral 1. The exterior surface of the lens is shown in perspective view. The lens 1 is located on the rear of a motor vehicle (not shown) on the side opposite the driver. There is, of course, a second and symmetrically shaped rear lens (not shown) located on the driver's side of the motor vehicle. The second lens (not shown) is similar to lens 1, but has an opposite configuration to adapt to the opposite side of the motor vehicle. The lens 1 is L-shaped such that a portion of the lens is visible from the rear of the car and another porition is visible from the side of the car. The lens 1 which is manufactured by Mercedes has five primary sections or panels. This Mercedes lens is an example for illustrative and explanatory purposes in setting out this disclosure. Other lenses have different panel arrangements; however, most have a side marker formed as an integral part thereof. The first panel 2 is generally referred to in the trade as a "side marker." When manufactured for the European market, the first panel 2 is a translucent amber color. Other lenses manufactured by different auto makers may have a slightly different configuration than lens 1; however, many have side markers which are the subject of this invention. An incandescent bulb (not shown) located behind the first panel 2 transmits light through the first panel 2 which is generally visible laterally or to the side of the car, hence, the term "side marker." When manufactured for the European market, the first panel 2 does not have a reflector molded therein or otherwise fixed interiorly thereof. The second panel 3 when manufactured for the European market is also amber in color and is generally referred to in the trade as the lens for the turn signal. The second panel 3 wraps around the body of the motor vehicle and is visible from both the side and the rear. The third panel 4 when manufactured for the European market or the American market is red in color and is generally referred to in the trade as the lens for the stop light. The third panel 4 is visible only from the rear of the car. The fourth panel 5 when manufactured for the European market or the U.S. market is transparent and is generally referred to as the lens for the back up light. The fifth panel 6 when manufactured for the European market or the American market is red in color and is generally referred to in the trade as the lens for the parking light. If the motor vehicle is pulled to the side of the road, a switching system can turn on an incandescent bulb (not shown) behind the fifth panel 6 which illuminates only that red panel nearest the highway thereby altering oncoming traffic that a vehicle is parked to the side of the road. This is a feature commonly found on large trucks and which has been recently introduced to passenger vehicles. Both the fourth panel 5 and the fifth panel 6 are visible only from the rear of the car.

Figure 2:
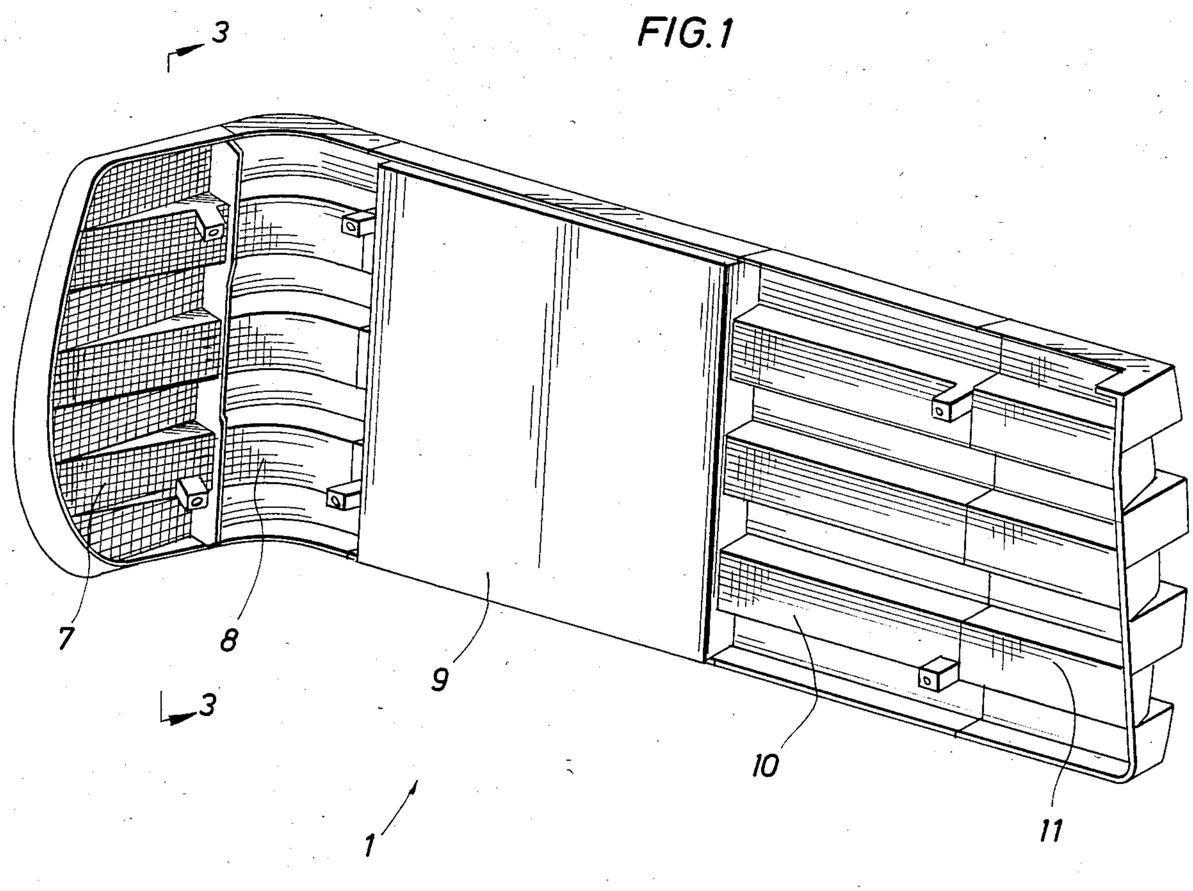
FIG. 2 shows the textured interior surface of a rear lens with side marker in perspective.

In FIG. 2, the interior surface of the translucent lens 1 is shown in perspective view. The textured interior surface 7 of the first panel 2 is shown on the lens 1. The textured interior surface 7 diffuses light as it passes through the lens 1. Immediately adjacent to the first panel 2 is the textured interior surface 8 of the second panel 3. Immediately adjacent thereto is the interior surface 9 of the third panel 4. Immediately adjacent thereto is the textured interior surface 10 of the fourth panel 5. Immediately adjacent thereto is the textured interior surface 11 of the fifth panel 6. Behind each panel are one or more incandescent bulbs (not shown) which are illuminated based on the function of the respective panel. The textured interior surfaces 7, 8, 10 and 11 diffuse the light from these incandescent bulbs.

Figure 3:
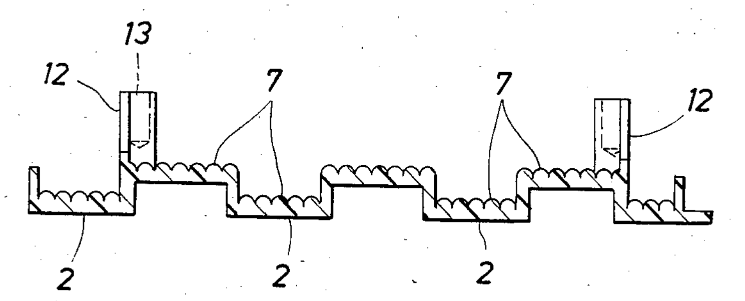
FIG. 3 shows a cross-sectional view of the side marker along lines 3—3 of FIG. 2.

In FIG. 3, the first panel 2 (side marker) of the lens 1 is shown in cross-sectional view along lines 3—3 of FIG. 2. The textured interior surface 7 of the first panel 2 of lens 1 is shown in cross section. The translucent lens 1 is generally configured to mount in a support housing (not shown) in the rear of the motor vehicle (not shown). The mounting post 12 has a hole 13 running partially along the center thereof which is designed to receive a screw (not shown). A sized and threaded screw goes through the support housing into hole 13 of mounting post 12 of lens 1 thereby affixing the lens 1 in the support housing. Several mounting posts cooperate with several screws to mount the lens in the support housing.

Figure 4:
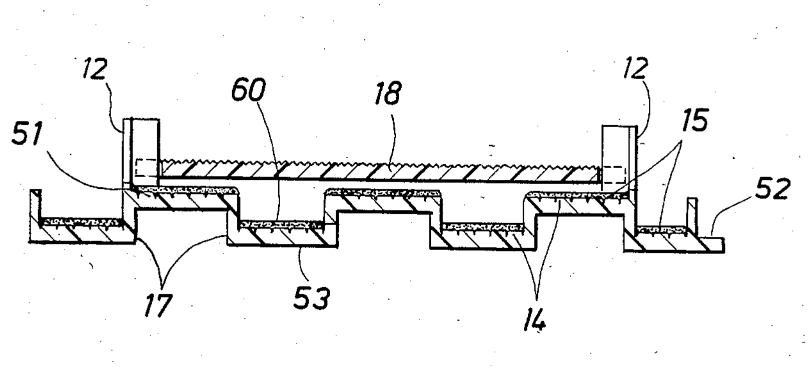
FIG. 4 shows a cross-sectional view of the side marker shown in FIG. 3 after completion of the conversion.
Figure 5:
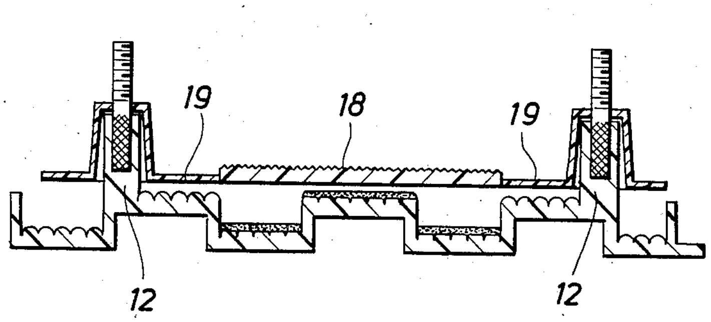
FIG. 5 shows a cross section of a converted side marker with a frame mounted thereon.

In FIG. 4, the same cross-sectional view of the side marker along lines 3—3 of FIG. 2 is shown. The textured interior surface 7 of the first panel 2 is ground to level 14. The grinding process does not necessarily totally eliminate the textured surface, but substantially reduces its height. Care must be taken in the grinding process not to overheat the plastic which can cause cracking. Care must also be taken during the grinding process not to become over zealous and grind a hole in the lens 1. After the grinding process is complete, a transparent filler 15 is applied to the ground textured interior surface 51 of the first panel 2. The filler tends to seek the lowest point in the ground textured interior surface 51. Typical grinding procedures include use of a motorized grinder with an abrasive disk or bit. Liquid coolant may be applied to the grinding process. After multiple coats of the transparent filler 15, a substantially flat surface 60 of transparent filler 15 begins to develop on top of the ground textured interior surface 51 of the first panel 2. The multiple coats are typically hand brushed. Between coats of the transparent filler 15, it is advantageous to apply a radiant heat source (not shown) to assist in drying. The radiant heat source reduces the humidity in the immediate viscinity of the transparent filler 15 and promotes evaporation of the solvents therein. The various coating thickness shown in FIGS. 4 and 5 are exaggerated for the sake of clarity.

Various fillers which are known in the art are suitable for this purpose provided that they dry transparent and are compatible with the basic lens material. Acrylic polymers disolved in Toluene have been found to be well suited for use with modern Mercedes lenses.

After the substantially flat surface 60 has been developed through the application of multiple coats of the transparent filler 15, a translucent colored stain or dye 17 is applied to the exterior surface 53 of the first panel 2 of lens 1, the interior surface 52 of the lens 1 which is not coated by the transparent filler 15 and the substantially flat surface 60 of the first panel 2 of lens 1. The stain or dye is typically applied by air brush or other spray medium. Between coats of the colored stain or dye 17, it is advantageous to apply a radiant heat source (not shown) to assist in drying. The radiant heat source reduces the humidity in the immediate viscinity of the stain or dye 17 and promotes evaporation of the solvents therein. Various stains or dyes, which are known in the art, are suitable for this purpose provided that they are translucent and compatable with the basic lens material. Stains or dyes which are suspended in acrylic polymers dissolved in Toluene have been found to be well suited for use with modern Mercedes lenses. In order to conform to U.S. regulations, a translucent red stain or dye is required.

A reflective panel 18 is shaped to fit the first panel 2 between the mounting posts 12. The reflective panel 18 is permanently affixed to the first panel 2 by a suitable fastner, either a mechanical fastner or adhesive. The reflective panel 18 also allows light from the incandescent bulb (not shown) mounted behind the panel 18 to pass through panel 18.

In FIG. 5, a cross-sectional view of a converted side marker is shown with a frame mounted thereon. This figure shows an alternative embodiment regarding mounting of the reflective panel 18. A frame 19 is generally adapted to fit around two or more mounting posts 12. The reflective panel 18 is permanently affixed to the frame 19. The lens 1 is contoured to fit a support housing (not shown) which is located in the body of the motor vehicle. An incandescent bulb is typically located behind the first panel 2 in the support housing. The reflective panel 18 is adapted to transmit light from the incandescent bulb located in the support housing which then passes through the first panel 2 and is generally visible from the side of the motor vehicle. Conversely, light which originates from a source outside of the motor vehicle and passes through the first panel 2 will strike the reflective panel 18 and be reflected back through the first panel 2 and be generally visible from the side of the motor vehicle.

While the foregoing is directed to the preferred embodiment of the present invention, other and further embodiments of the invention may be devised without departing from the basic scope thereof, and the scope thereof is determined by the claims which follow:

What is claimed is:

1. A method for converting a translucent motor vehicle lens having an exterior surface and a textured interior surface into a lens through which light can be reflected, the method comprising: grinding the textured interior surface of said lens to a reduced height;

applying multiple coats of a transparent filler to reduce the texturing of said interior surface of said lens;

applying a translucent colored stain to the exterior surface of said lens and to the interior surface of said lens; and affixing a reflective panel to said lens adjacent said interior surface.

2. The method of claim 1 wherein said reflective panel is permanently mounted on a frame, and said frame is affixed to said lens.

3. The method of claim 1 wherein said application of filler drys to form a substantially flat surface over said ground textured interior surface.

4. The method of claim 1 including the additional step of drying said transparent filler by radiant heat.

5. The method of claim 3 including the additional step of drying said transparent colored stain by radiant heat.

6. The method of claim 1 wherein the reflective panel is capable of transmitting light from a light source located behind said reflective panel and said reflective panel is positioned at a location relative to said lens for lateral visibility relative to the motor vehicle.

7. A motor vehicle lens comprising:

a translucent plastic panel contoured to fit a support housing, said panel having an exterior surface and a textured interior surface to diffuse light waves;

a transparent coating applied to said textured interior surface, said coating drying to a substantially flat surface thereby reducing the diffusion of light waves passing through said panel and said coating;

a translucent stain applied to said exterior of said panel and to said interior surface of said panel; and a reflector shaped to fit and permanently affixed to said paned adjacent to said interior surface, said reflector being capable of transmitting light from a light source located behind said reflector in said support housing.

8. The motor vehicle lens comprising:

a translucent plastic panel contoured to fit a support housing, said panel having an exterior surface and a textured interior surface to diffuse light waves;

a transparent coating applied to said textured interior surface, said coating drying to a substantially flat surface thereby reducing the diffusion of light waves passing through said panel and said coating;

a translucent stain applied to said exterior surface of said panel and to said interior surface of said panel; and a reflector permanently affixed to a frame which mounts on said lens, said reflector being capable of transmitting light from a light source located behind said reflector in said support housing.

9. The lens of claim 7 wherein said translucent plastic panel is of amber color.

10. The lens of claim 9 wherein said translucent stain is of red color.

11. The lens of claim 8 wherein said translucent plastic panel is of amber color.

12. The lens of claim 11 wherein said translucent stain is of red color.

* * * * *